(12) United States Patent
Kleeberg et al.

(10) Patent No.: US 12,531,173 B2
(45) Date of Patent: Jan. 20, 2026

(54) SURGE ARRESTING POWER CABLE

(71) Applicant: Applied Research Associates, Inc., Albuquerque, NM (US)

(72) Inventors: David A. Kleeberg, Lakehills, TX (US); Charles Dudley, San Antonio, TX (US); Kyle A. Lyke, Helotes, TX (US)

(73) Assignee: Applied Research Associates, Inc., Albuquerque, NM (US)

( * ) Notice: Subject to any disclaimer, the term of this patent is extended or adjusted under 35 U.S.C. 154(b) by 672 days.

(21) Appl. No.: 17/944,503

(22) Filed: Sep. 14, 2022

(65) Prior Publication Data
US 2024/0087779 A1    Mar. 14, 2024

(51) Int. Cl.
*H01C 7/12* (2006.01)
*H01R 13/66* (2006.01)

(52) U.S. Cl.
CPC .......... *H01C 7/12* (2013.01); *H01R 13/6666* (2013.01)

(58) Field of Classification Search
CPC .............................. H01C 7/12; H01R 13/6666
USPC ..................................................... 439/620.08
See application file for complete search history.

(56) References Cited

U.S. PATENT DOCUMENTS

| | | | | |
|---|---|---|---|---|
| 3,619,708 A | * | 11/1971 | Stetson | H01T 4/20 315/59 |
| 3,819,987 A | * | 6/1974 | Sakshaug | H01T 4/16 361/126 |
| 3,987,343 A | * | 10/1976 | Cunningham | H01T 4/06 315/36 |
| 4,089,032 A | * | 5/1978 | Dell Orfano | H02H 9/042 361/111 |
| 4,439,807 A | * | 3/1984 | Reitz | H01C 7/12 361/91.1 |

(Continued)

FOREIGN PATENT DOCUMENTS

| | | | | |
|---|---|---|---|---|
| CH | 683732 A5 | * | 4/1994 | H01H 85/44 |
| CN | 1037804 A | * | 12/1989 | H01H 85/44 |

(Continued)

OTHER PUBLICATIONS

PCT Patent Application PCT/US2023/032460 International Search Report and Written Opinion of the International Searching Authority issued Dec. 15, 2023.

*Primary Examiner* — Peter G Leigh
(74) *Attorney, Agent, or Firm* — Erise IP, P.A.

(57) ABSTRACT

Embodiments of the disclosure provide an electrical power surge arresting apparatus. Specifically, the surge arresting apparatus may be implemented within a port of an electrical power cord. In some embodiments, the surge arresting power cable comprises a plurality of conductive plates that may be attached to the hot, neutral, and ground leads of the electrical power cord. A plurality of Metal Oxide Varistors (MOV) may be positioned between the plurality of conductive plates. The plurality of conductive plates may be directly coupled to or comprise a plurality of conductive clips that may be configured to directly couple to a surge protected electronic device. Accordingly, there are no leads between the surge protecting device and the surge protected electronic device. The surge arresting device may further comprise one or more capacitors serving as a low-pass filter.

20 Claims, 6 Drawing Sheets

(56) References Cited

U.S. PATENT DOCUMENTS

| | | | | |
|---|---|---|---|---|
| 4,907,119 | A | * | 3/1990 | Allina .................... H02H 9/042 361/111 |
| 5,130,884 | A | * | 7/1992 | Allina ...................... H01C 7/12 338/21 |
| 5,140,491 | A | * | 8/1992 | Allina ................ H01R 13/6666 361/127 |
| 5,414,587 | A | * | 5/1995 | Kiser .................. H01R 13/665 361/127 |
| 5,608,596 | A | * | 3/1997 | Smith ...................... H01C 7/12 361/111 |
| 5,721,664 | A | * | 2/1998 | Uken ...................... H01C 8/04 361/127 |
| 5,724,221 | A | * | 3/1998 | Law ........................ H01C 7/12 361/111 |
| 5,757,603 | A | | 5/1998 | Kapp et al. |
| 5,936,824 | A | * | 8/1999 | Carpenter, Jr. ......... H01C 7/112 361/126 |
| 6,211,770 | B1 | * | 4/2001 | Coyle .................... H01C 7/126 338/21 |
| 6,430,019 | B1 | * | 8/2002 | Martenson ............. H01C 7/126 361/103 |
| 8,125,308 | B1 | | 2/2012 | Barton |
| 8,699,197 | B2 | * | 4/2014 | Douglass ............... H01C 7/126 361/117 |
| 8,854,786 | B2 | | 10/2014 | Fu et al. |
| 9,761,356 | B2 | * | 9/2017 | Hsu ........................ H01C 1/144 |
| 10,446,300 | B2 | | 10/2019 | Wang et al. |
| 2006/0056126 | A1 | | 3/2006 | Meltzer |
| 2012/0050935 | A1 | * | 3/2012 | Douglass ............... H01C 7/126 361/103 |
| 2012/0050936 | A1 | * | 3/2012 | Douglass ................. H01C 7/12 361/111 |
| 2013/0271890 | A1 | * | 10/2013 | Spalding ................ H02H 9/042 361/111 |
| 2017/0338013 | A1 | * | 11/2017 | Hsu ........................ H01C 7/102 |
| 2018/0358804 | A1 | | 12/2018 | Pelegris et al. |

FOREIGN PATENT DOCUMENTS

| | | | | |
|---|---|---|---|---|
| CN | 1096725 | C | * 12/2002 | ......... H01R 13/6666 |
| DE | 202012002395 | U1 | * 5/2012 | ......... H01R 13/6666 |
| EP | 0017337 | A1 | 10/1980 | |
| EP | 716493 | A1 | 6/1996 | |
| EP | 0908973 | A2 | * 4/1999 | ......... H01R 13/6666 |
| EP | 2294589 | | 10/2015 | |
| EP | 3240132 | B1 | 11/2017 | |
| FR | 2582875 | A1 | * 12/1986 | ........... H01R 3/6666 |
| JP | H0696835 | A | * 4/1994 | ................ H01C 7/10 |
| WO | 9728593 | A1 | 8/1997 | |
| WO | WO-2006059826 | A1 | * 6/2006 | ............. H01C 7/10 |
| WO | 2019193005 | | 10/2019 | |
| WO | 2021168585 | A1 | 9/2021 | |

* cited by examiner

SURGE ARRESTING POWER CABLE

BACKGROUND

1. Field

Embodiments of the invention relate to an apparatus for electrical power surge protection. Specifically, embodiments of the invention relate to surge arresting circuitry for implementation within a power cable.

2. Related Art

Electronic equipment is commonly damaged by power surges resulting from power fluctuations, lightning, geomagnetic storms, electromagnetic pulses, and other unexpected occurrences. The excessive power contained in power surges may melt insulation, burn electronic components, and cause electrical arcing. Due to these unforeseen events, it is desirable to protect electronic equipment with surge arresting devices.

Typically, Metal Oxide Varistors (MOVs) are used in surge protecting circuitry to dissipate large amounts of energy. Typical arrangements of MOVs may allow for the dissipation of energy protecting electronic components from the power surge. Typical surge protecting circuitry comprises leads, or wires, disposed between the surge protection components and the electronics that are protected. These leads cause inductance that results in a resistance to changing current flow. As a result, leads at this point delay the surge protection provided by the MOVs. Additionally, surge protecting devices are typically implemented along a power cable, not directly at the electrical components, which can receive damaging energy between typical surge arresting devices and any electronic devices that the surge arresting devices are protecting. Many surge protecting devices that implement MOVs can fail to maximize the arrangement and the positioning of the MOVs. Consequently, typical surge arresting devices result in delayed reaction times. Therefore, typical surge arresting devices react relatively slowly to power surges which may damage electronic device before the typical surge arresting devices can safely channel damaging current away from the electrical components.

What is needed is a leadless surge arresting device that is compact enough to be positioned within the port of a power cable to minimize the distance between the power arresting device and the electronic components that are protected.

SUMMARY

Embodiments of the invention solve the above-mentioned problems by providing a surge device disposed in a surge arresting power cable for protecting electronic devices from power surges.

An embodiment of the surge arresting power cable may arrange a plurality of conductive plates that may be coupled to the hot, neutral, and ground leads of a power transmission line. A plurality of metal oxide varistors may be placed between the hot, neutral, and ground conductive plates. Because the resistance of MOVs varies with the input voltage, the MOVs may be arranged to short the current to the ground plate when a power surge occurs. Additionally, the positioning of the conductive plates induces a level of capacitance that serves as a low-pass filter. The positioning of the MOVs between the conductive plates allows the conductive plates to be coupled directly to conductive clips to connect directly to the electronic component that is protected. This minimizing the distance between the surge protecting device and the protected electrical components. The arrangements described herein also remove the need for leads between the surge protecting device and the protected electrical components.

A first embodiment is directed to a surge arresting apparatus. The surge arresting apparatus comprises a plurality of metal oxide varistors, a plurality of conductive plates configured to conduct electrical energy between an electric power transmission cable and an electronic device, and a plurality of conductive clips directly coupled to the plurality of conductive plates and configured to directly connect to the electronic device, wherein the plurality of metal oxide varistors are configured to redirect electrical current to a ground wire when a voltage above a threshold voltage is received at the plurality of conductive plates.

A second embodiment is directed to a surge arresting apparatus. The surge arresting apparatus comprises an electric power transmission cable for transmitting power to an electronic device. The electric power transmission cable comprises a hot wire configured to carry current to the electronic device, a neutral wire configured to carry current from the electronic device, and a ground wire configured to carry current when a transient voltage is above a threshold voltage. The surge arresting apparatus further comprises a surge arresting device connected in parallel with the electric power transmission cable and configured to redirect current. The surge arresting device comprises a plurality of metal oxide varistors, and a plurality of conductive plates configured to conduct electrical energy between the electric power transmission cable and the electronic device. The surge arresting apparatus further comprises a plurality of conductive clips directly coupled to the plurality of conductive plates and configured to directly connect to the electronic device, wherein the plurality of metal oxide varistors are configured to redirect electrical current to ground when the transient voltage is above the threshold voltage.

A third embodiment is directed to a surge arresting apparatus. The surge arresting apparatus comprises an electric power transmission cable for transmitting power to an electronic device. The electric power transmission cable comprises a hot wire configured to carry current to the electronic device, a neutral wire configured to carry current from the electronic device when al circuit is complete, and a ground wire configured to carry current when a transient voltage is above a threshold voltage. The surge arresting apparatus further comprises a surge arresting device connected to the electric power transmission cable and configured to redirect current. The surge arresting device comprises a first metal oxide varistor connected between the hot wire and the ground wire, a second metal oxide varistor connected between the neutral wire and the ground wire, a third metal oxide varistor connected between the neutral wire and the hot wire, and a plurality of conductive plates configured to conduct electrical energy between the electric power transmission cable and the electronic device. The surge arresting apparatus further comprises a plurality of conductive clips directly coupled to the plurality of conductive plates and configured to directly connect to the electronic device, wherein the first metal oxide varistor, the second metal oxide varistor, and the third metal oxide varistor are configured to redirect electrical current to ground when the transient voltage is above the threshold voltage.

A fourth embodiment is directed to any of the first, second, and third embodiments further comprising one or more capacitors configured in a stacked arrangement to form a low-pass filter.

A fifth embodiment is directed to any of the first through fourth embodiments, wherein the surge arresting device is disposed in a port, and wherein the power transmission cable and port are configured as International Electrotechnical Commission (IEC) C13, C14, Type A-Type O, or National Electrical Manufacturers Association (NEMA) power transmission cables and ports.

A sixth embodiment is direct to any of the first through fifth embodiments wherein the surge arresting device is configured to provide current to the electronic device when 120 Volts is applied to the surge arresting device, and the threshold voltage is greater than 120 Volts.

A seventh embodiment is directed to any of the first through fifth embodiments, the surge arresting device is configured to provide current to the electronic device when 220 Volts is applied to the surge arresting device, and the threshold voltage is greater than 220 Volts.

An eighth embodiment is directed to any of the first through seventh embodiments and further comprising a first conductive plate contacting the first metal oxide varistor and connected to the ground wire, a second conductive plate contacting the first metal oxide varistor and the second metal oxide varistor and connected to either the hot wire or the neutral wire, and a third conductive plate contacting the third metal oxide varistor and connected to either the hot wire or the neutral wire.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
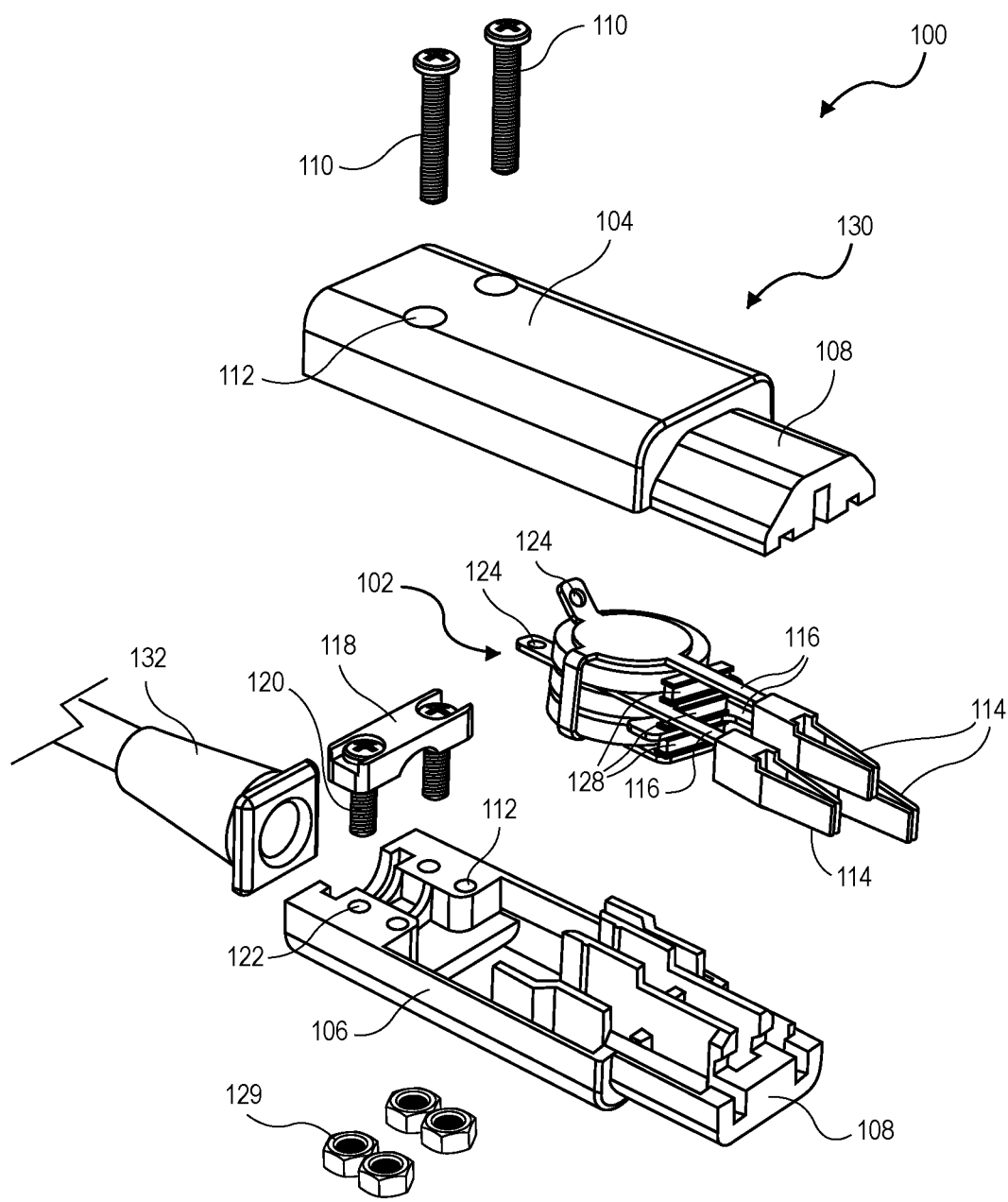
FIG. 1 depicts an exploded view of a surge arresting power cable.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to a surge arresting power cable comprising a surge arresting device. In some embodiments, the surge arresting device may be directly connected to or manufactured with conducting pins. The conducting pins may be coupled directly to the surge protected electronic components of a surge protected electronic device thereby eliminating any need for leads. In some embodiments, the surge arresting device may be housed within a power cable port to ensure the surge arresting device is at the closest external proximity to the electronic devices being protected from the power surges. In some embodiments, the power transmission cables and ports may comply with the regulations of International Electrotechnical Commission (IEC) C13, C14, Type A-Type O, or National Electrical Manufacturers Association (NEMA) power transmission cables and ports. Though these exemplary cables and ports are provided as examples, the embodiments of the surge protection device described herein may be compatible with any standard cables and ports. In some embodiments, the surge arresting power cable may comprise the surge arresting device that is coupled between power transmission cable wires and the surge protected electronic device. The surge arresting device may be housed within an electrical insulating cable. In some embodiments, the surge arresting device may be housed within the insulating port of the electrical insulating cable. For example, the electrical insulating cable may be an IEC C13 power cable for the compatibility with a plurality of protected electronic devices. The conducting pins may be coupled to, or part of, the power arresting device, and may be inserted into the IEC C13 outlet of the surge protected electronic device so that the surge protected electronic device is protected from power surges. In some embodiments, the surge arresting device is part of the surge arresting power cable and connected in parallel with the surge arresting power cable.

In some embodiments, the surge arresting device may comprise a plurality of conductive plates that may be coupled to the hot, neutral, and ground leads of a power transmission line. A plurality of metal oxide varistors (MOV) may be placed between the hot, neutral, and ground conductive plates. Because the resistance of the MOV varies with the input voltage, the MOV may be arranged to short the current to the ground plate when a power surge occurs. Additionally, capacitors may be positioned between each of the hot, neutral, and/or ground lines to induce a level of capacitance that serves as a low-pass filter. The positioning of the MOV between the conductive plates allows the conductive plates to be coupled directly to, or manufactured with, conductive pins to connect directly to the surge protected electronic component. This minimizes the distance between the surge protecting device and the surge protected electrical device. The arrangements described herein also eliminates the need for leads between the surge protecting device and the surge protected electrical components. This deceases the amount of time the surge arresting system takes to respond to the current induced from the external energy. In turn, the amount of unwanted current delivered to the protected hardware is limited.

The surge arresting power cable may be used for the protection of devices using a standard International Electrotechnical Commission (IEC) C13 power cable which is common for most computers, monitors, printers, and various audio/video equipment. In some embodiments, the surge arresting power cable is disposed within the housing of the IEC C13 power cable port. Additionally, the surge arresting power cable may be used with electrical wall outlets in the range of 120 to 240 volts. These are exemplary uses and the surge arresting power cable may be used in any standard or custom port leading to any electrical components to be protected. Any size, material, and arrangement of MOV and conductive plates may be used based on the expected electrical potential, current, and use case.

In some embodiments, the surge arresting device may comprise three conductive plates and three MOV. The surge arresting device can further be classified as "leadless" as no leads or wires are used in the arrangement of the surge arresting device. For example, the surge arresting device may be coupled directly to conductive pins that are configured to couple directly to an outlet of the protected electronic device. Accordingly, no leads are used between the surge protecting device and the surge protected electronic device.

In some embodiments, the surge arresting device may be disposed in parallel with a power transmission cable. The surge arresting device may comprise a vertical stack of a plurality of conductive plates (e.g., the three conductive plates). Beginning under the top conductive plate, the plurality of MOV (e.g., three MOV) may be placed in-between the conductive plates, with the last MOV being placed under the bottom conductive plate. Each conductive plate may comprise a perforated tab extending from a main body of the conductive plate for coupling to the hot, ground, and neutral wires of the power transmission cable, respectively. Additionally, the conductive plates may each have an extended tab for coupling to conductive pins aligned to receive the ground, neutral, and hot pins of the surge protected electronic device.

In some embodiments, the top conductive plate may have a hooked tab that reaches to the bottom MOV to ensure that each MOV is making direct contact with the conductive plate coupled to ground. The conductive plates and MOV may be arranged in this embodiment to ensure that there is an MOV between each of the hot, ground, and neutral nodes, as well as to ensure that each MOV is making direct contact with the entire face of a conductive plate. Ensuring a large surface area of contact between the MOV and conductive plates increases the amount of power the MOV can safely channel to ground.

In some embodiments, the surge arresting device may receive an increase in voltage above a threshold value, which may cause the MOV to safely route current to ground through the conductive plate coupled to the ground wire. Routing the current through the MOV prevents the power surge from affecting the surge protected electronic components of the surge protected electronic device that are coupled to the surge arresting power cable.

In some embodiments, a single capacitor or a plurality of capacitors may be disposed near the MOV and arranged such that each capacitor is positioned on each line (i.e., hot, neutral, and/or ground). The arrangement of the one or more capacitors may induce a capacitance, which serves as a low pass filter for a range of voltage frequencies.

FIG. 1 depicts an exemplary exploded view of surge arresting power cable 100 for some embodiments. The surge arresting power cable may be configured to couple, and provide power, to any surge protected electronic device. Here, surge arresting power cable 100 is configured as an IEC C13 cable; however, surge arresting power cable 100 may take various configurations as described above. In some embodiments, surge arresting device 102 may be housed centrally between power cable port top 104 and power cable port bottom 106. Power cable port top 104 and power cable port bottom 106 may be designed for the insertion into IEC C13 power outlet ports and, therefore, power cable port top 104 and power cable port bottom 106 may comprise a port 108 that matches standard IEC C13 port measurements. Specifically, power cable port top 104 and power cable port bottom 106 may be coupled together with the insertion of screws 110 into threaded holes 112. Various other fasteners, such as bolts, pins, adhesives, or the like may be used to couple power cable port top 104 to power cable port bottom 106 without departing from the scope hereof. Though, a standard commercial off-the-shelf port (COTS) is shown and described herein, any port may be used that may house surge arresting device 102. In some embodiments, surge arresting power cable port 130 may be any COTS or customized port connecting to any electronic device.

Furthermore, housed within surge arresting power cable port 130 may be conductive clips 114 that are part of, or coupled to, extended plate tabs 116 of surge arresting device 102. Conductive clips 114 may be configured to attach to any outlet of an electronic device to be surge protected. For example, as shown, conductive clips 114 are configured to couple to an IEC C13 plug pin (not shown). The IEC C13 plugin is exemplary as this type of plugin is standard for many computers and machines in use today; however, any plugin type may be used. Furthermore, conductive clips 114 may be configured corresponding to the number of lines in the power transmission cable 306 (FIG. 3B). In some embodiments, the number of lines to which surge arresting device 102 may be coupled may be one, two, three, or any number of lines. In some embodiment, surge protection device may be configured to be coupled to 7-pin connectors, 12-pin connectors, serial ports, or any other type of connector for any surge protected electronic device.

In some embodiment, bracket 118 may be installed using bracket screws 120 into bracket holes 122 and secured by bracket nuts 129. Bracket 118 may be used to secure power transmission cable wires to surge arresting power cable port 130 to prevent movement and wear of the wires. Collar 132 may receive and secure the power transmission cable 306 as described in further detail below. The power transmission cable wires may then be coupled to the perforated plate tabs 124 of surge arresting device 102. Bracket 118 may additionally be used to relieve individual tension from the hot, neutral, and ground leads of a transmission power cable. The connection between power transmission cable 306 and surge arresting device 102 is discussed in more detail below. Any arrangement and connection of surge arresting device 102 to the power cables may be imagined.

Figure 2A:
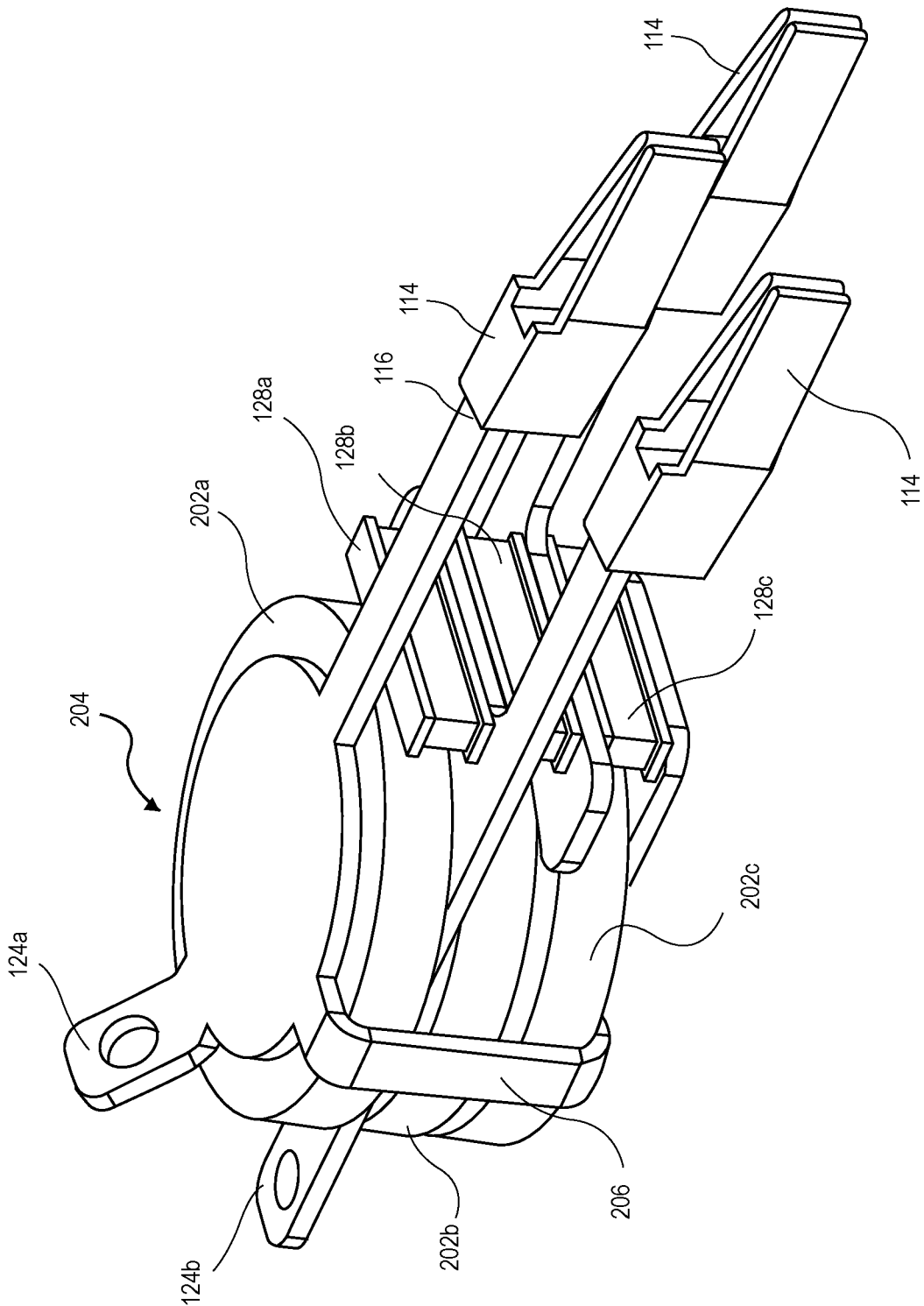
FIG. 2A depicts a surge arresting device.
Figure 2B:
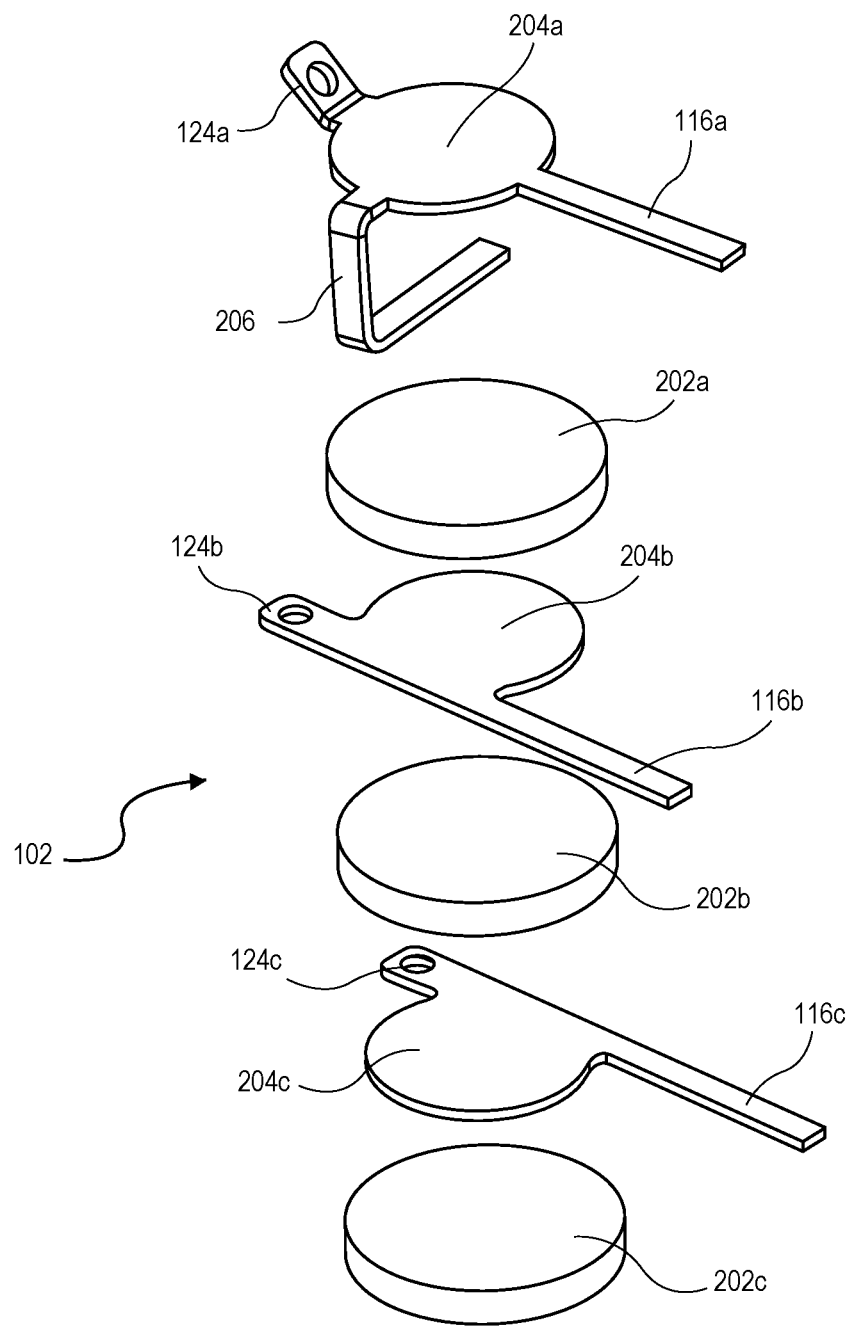
FIG. 2B is an exploded view of the surge arresting device.

FIG. 2A depicts an embodiment of surge arresting device 102, and FIG. 2B depicts an exploded view of the embodiment of surge arresting device 102. Surge arresting device 102 comprises MOV 202 as well as conductive plates 204 which will be discussed further regarding FIG. 2B. In some embodiments, MOV 202 and conductive plates 204 may be one or more or a plurality of MOV and/or one or more or a plurality of conductive plates 204. Conductive plates 204 comprises top conductive plate 204a, middle conductive plate 204b, and bottom conductive plate 204c. Similarly, in some embodiments, extended plate tabs 116 comprises top extended tab 116a, middle extended tab 116b, and bottom extended tab 116c. Similarly, in some embodiments, perforated plate tabs 124 comprises top perforated tab 124a, middle perforated tab 124b, and bottom perforated tab 124c. Similarly, in some embodiments, MOV 202 comprises top MOV 202a, middle MOV 202b, and bottom MOV 202c. Similarly, capacitors 128 comprises top capacitor 128a, middle capacitor 128b, and bottom capacity 128c.

In some embodiments, top conductive plate 204a comprises top extended tab 116a, top perforated tab 124a, and hooked conductive tab 206. The perforated plate tabs 124 may be coupled to the ground, hot, or neutral wires of a power transmission cable 306. In some embodiments, the bottom face of top conductive plate 204a abuts the top face of a top MOV 202a. Hooked conductive tab 206 may extend down and wrap to the bottom of surge arresting device 102, contacting a perimeter of a middle MOV 202b and a bottom MOV 202c on a perimeter and a bottom face thereof. Hooked conductive tab 206 may secure the arrangement of surge arresting device 102.

FIG. 2B depicts an exemplary arrangement of surge arresting device 102. In some embodiments, the bottom face of top conductive plate 204a may abut a top face of top MOV 202a. A bottom face of top MOV 202a may abut a top face of middle conductive plate 204b. In some embodiments, middle conductive plate 204b comprises middle perforated tab 124b and middle extended tab 116b. The bottom face of middle conductive plate 204b may abut a top face of middle MOV 202b. The bottom face of middle MOV 202b may abut a top face of bottom conductive plate 204c. In some embodiments bottom conductive plate 204c may be identical to middle conductive plate 204b. As seen in the embodiment depicted in FIG. 2B, bottom conductive plate 204c is flipped so that middle extended tab 116b of middle conductive plate 204b and bottom extended tab 116c may easier align with conductive clips 114.

In some embodiments, the bottom face of the bottom conductive plate 204c may abut a top face of a bottom MOV 202c. The hooked conductive tab 206 of top conductive plate 204a may contact the bottom face of bottom MOV 202c providing a conductive surface below bottom MOV 202c. In some embodiments, the hooked conductive tab 206 may extend horizontally from top conductive plate 204a so that it does not contact middle conductive plate 204b, middle MOV 202b, or bottom conductive plate 204c. In alternate embodiments, hooked conductive tab 206 of top conductive plate 204a may contact middle MOV 202b at the perimeter of middle MOV 202b. The surge arresting device 102 may allow for the transfer of current between conductive plates 204 depending on the state of MOV 202. The state of MOV 202 may depend on current flowing through surge arresting device 102 as described in more detail below. The arrangement of surge arresting device 102 may be described by the electrical diagram in FIG. 2C.

In some embodiments, conductive plates 204 may comprise a conductive material or a plurality of conductive materials. In some embodiments conductive plates 204 may comprise copper, aluminum, nickel, stainless steel, gold, lead, or any other metal or conductive material. Conductive plates 204 may comprise conductive clips 114 and conductive clips 114 may comprise the same as, or a different material than, conductive plates 204. In some embodiments, conductive plates 204 may be manufactured with conductive clips 114 as conductive clips may be part of conductive plates 204.

In some embodiments, capacitors 128 may be coupled to conductive plates 204. Top capacitor 128a may be disposed between top conductive plate 204a and middle conductive plate 204b. Middle capacitor 128b may be disposed between middle conductive plate 204b and bottom conductive plate 204c. Bottom capacitor 128c may be disposed between bottom conductive plate 204c and the bottom surface plate provided by hook conductive tab 206 as part of top conductive plate 204a. As such, a capacitor may be disposed between lines hot and neutral, hot and ground, and neutral and ground.

In some embodiments, one, two, three, or more capacitors may be used. In some embodiments, only top capacitor 128a, middle capacitor 128b, or bottom capacitor 128c may be used. Alternatively, two capacitors may be used. It should be understood that any capacitors in any arrangement may serve as a low pass filter.

Figure 2C:
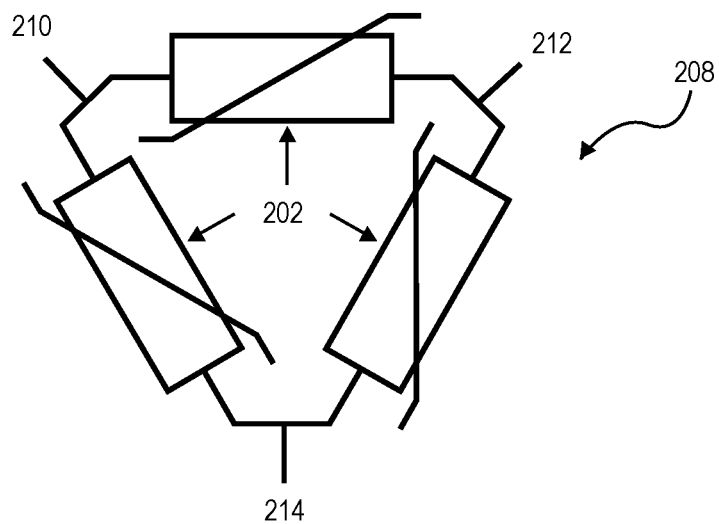
FIG. 2C depicts an exemplary diagram of a metal oxide varistor arrangement.

FIG. 2C depicts an exemplary arrangement 208 of MOV 202. In the exemplary arrangement shown, MOV 202 are disposed between each of hot wire 210, neutral wire 212, and ground wire 214. Therefore, if a current spikes on any of conductors, the current will be shorted to ground for the duration of the electrical transient. Exemplary arrangement 208 of the MOV 202 depicted here may be altered to comprise any number and arrangement of MOV 202 in series or parallel (as described herein). Furthermore, any other arrangement of MOV may be utilized with the leadless arrangements described herein. Additionally, the varistor nominal voltage of the MOV 202 may vary throughout embodiments. As described above, exemplary arrangement 208 of MOV 202 may include capacitors 128 disposed between hot wire 210, neutral wire 212, and ground wire 214 along with MOV 202.

Figure 3A:
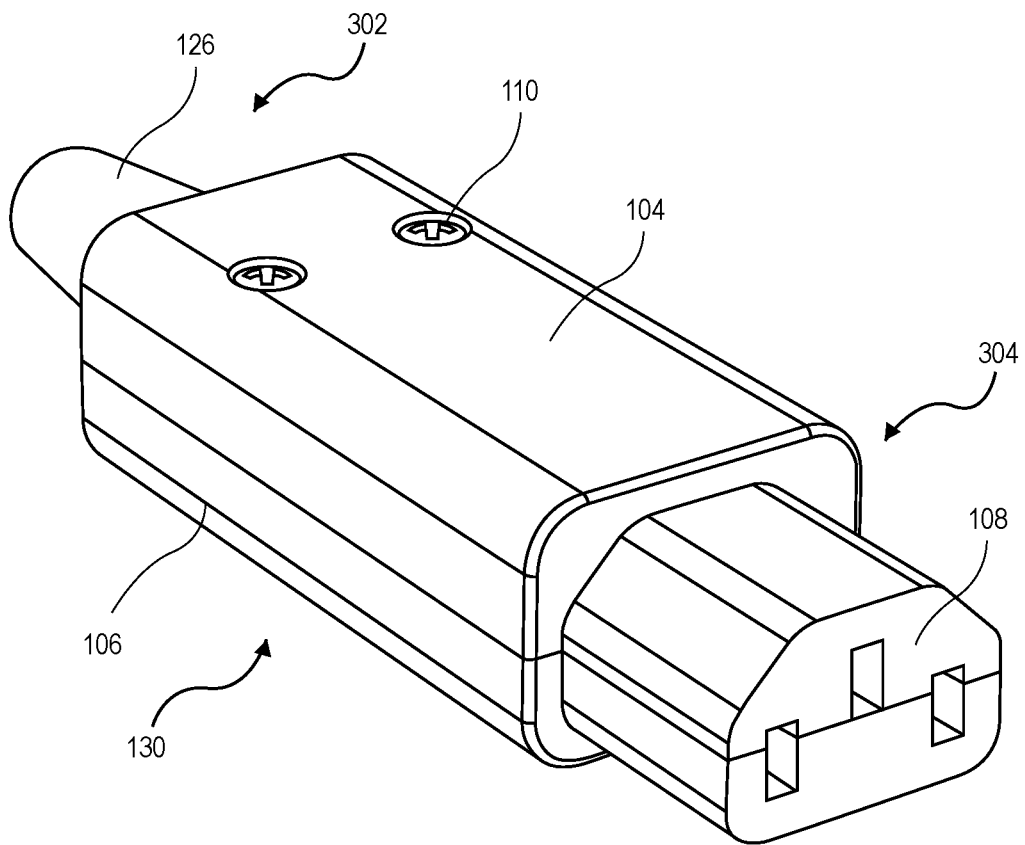
FIG. 3A depicts a surge arresting power cable port.
Figure 3B:
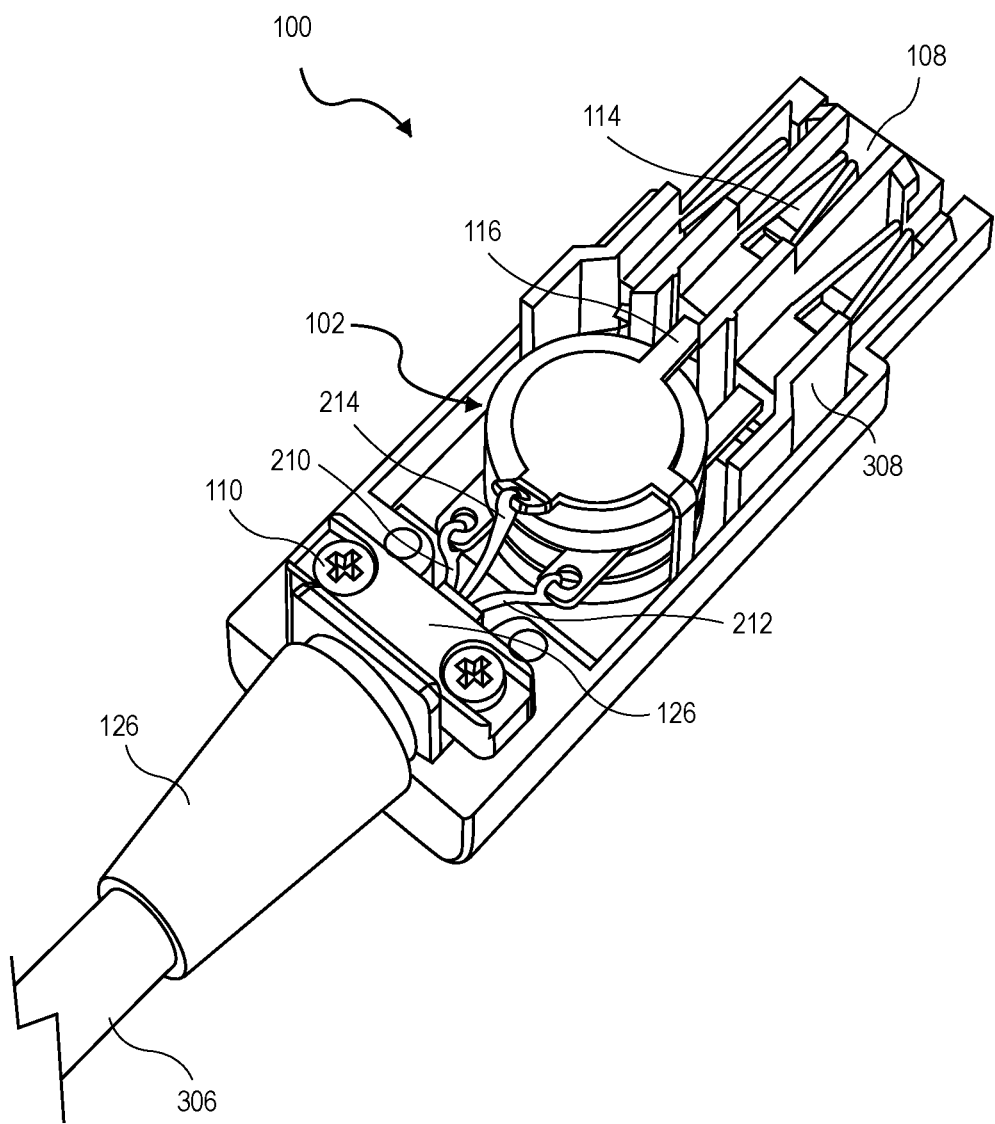
FIG. 3B depicts an arrangement of components of the surge arresting power cable.

FIG. 3A depicts an exterior upper perspective view of an embodiment of surge arresting power cable port 130. Threaded screws 110 may fasten power cable port top 104 and power cable port bottom together to form surge arresting power cable port 130. Surge arresting power cable port 130 may comprise two ends, wherein cable end 302 is coupled to power transmission cable collar 132, and port end 304 may comprise port 108. In the depicted embodiment, port 108 may be compatible with IEC C13 outlets; however, port 108 may be molded for compatibility with a plurality of power cable interfaces. As described in embodiments herein, port 108 may receive metal prongs for transferring current between the component to be surge protected and surge protecting power cable 100 connecting directly to conductive clips 114, which are connected directly to MOV 202. Therefore, the are no leads between the surge protected electrical device that is protected and surge arresting device 102. In some embodiments, the surge protected electrical device may be any computer, mobile device, smart phone, appliance, machine, or any other device with electrical components that may fail during a power surge.

FIG. 3B depicts an embodiment of surge arresting power cable 100. In some embodiments, surge arresting power cable 100 comprises power transmission cable 306 comprising hot wire 210, neutral wire 212, and ground wire 214. As shown, hot wire 210 is connected to bottom conductive plate 204c, neutral wire 212 is connected to middle conductive plate 204b, and ground wire 214 is connected to top conductive plate 204a. In some embodiments, hot wire 210 may be described as line or line wire herein. Therefore, the corresponding conductive extended plate tabs 116 comprise the corresponding conductive clips 114. In some embodiments, hot wire 210, neutral wire 212, and ground wire 214, may be connected to any of perforated tabs 126 and conductive plates 204 may be arranged in any order. Therefore, any arrangement of conducting electricity through surge arresting power cable 100 can be imagined. Furthermore, any arrangement of conducting electricity through conductive clips 114 to the surge protected electronic device may be imagined.

Surge arresting device 102 may be housed within the surge arresting power cable port 130. Interior port housing walls 308 may be used to further secure and isolate the conductive components of surge arresting power cable 100. Specifically, interior port housing walls 308 may be molded to securely fit surge arresting device 102 and conductive clips 114. Additionally interior port housing walls 308 may electrically isolate ground wire 214, neutral wire 212, and hot wire 210 couplings of extended plate tabs 116 to conductive clips 114. In some embodiment, conductive clips 114 may be arranged to receive extended plate tabs 116 of the surge arresting device 102. Further, conductive clips 114 may be designed to receive conductive pins of an IEC C13 outlet (not pictured).

When coupling surge arresting device 102 to power transmission cable 306, perforated tabs 126 of top conductive plate 204a, middle conductive plate 204b, and bottom conductive plate 204c may be coupled to the ground wire 214, neutral wire 212, and hot wire 210 wires of power transmission cable 306, respectively. When a power surge occurs, the level of inductance of the MOV 202 may change within nanoseconds. The MOV 202 may route the surge current to the top conductive plate 204a to safely ground the power surge. A threshold value for a parameter such as voltage, current, or the like, may be established based on the arrangement of surge arresting device 102 such that when the parameter reaches said threshold, the current is passed to ground through the MOV 202.

Furthermore, in some embodiments, the arrangement of capacitors 128 may provide capacitance that acts as a low pass filter. The distance between capacitors 128 and the size of capacitors 128 may be optimized based on power transfer to MOV 202 and based on a desired frequency filter of the low pass filter generated by the capacitance of capacitors 128.

In some embodiments, an alternate molded housing (not shown) may be used for the implementation of surge arresting power cable 100 for a plurality of different outlet interfaces. Alternate interior housing walls may be used to further isolate extended plate tabs 116 of surge arresting device 102. The top conductive plate 204a may be placed on the bottom of the component stack, wherein the hooked conductive tab 206 of top conductive plate 204a may reach up to contact a top MOV 202a. Any arrangement may be imagined and for any port for an electronic device.

Figure 4:
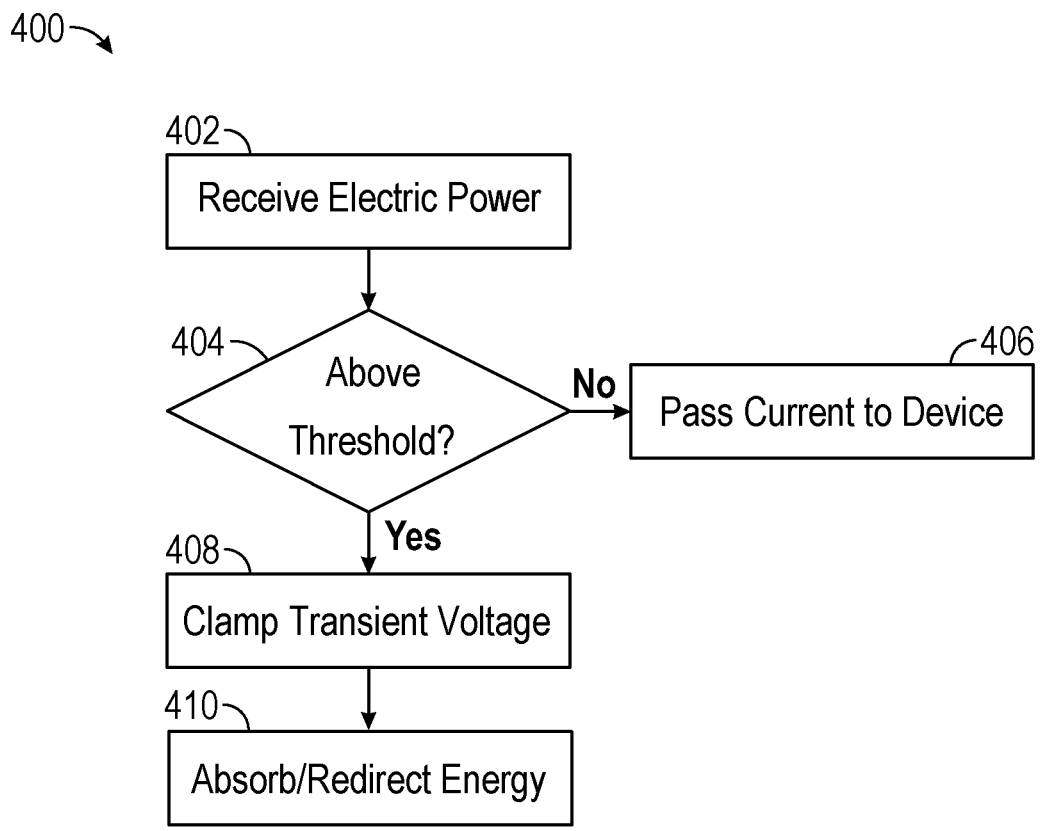
FIG. 4 is a flowchart depicting an exemplary method of surge arresting by the surge arresting power cable.

FIG. 4 depicts a flowchart 400 for a method of arresting power surge in surge arresting power cable 100. At step 402, electric power may be received. The electric power source may be any standard voltage such as 120V, 220V, or the like. In some embodiments, the voltage source may be a higher or lower voltage source depending on the use case. The size, shape, and arrangement of the components of surge arresting power cable 100 and surge arresting device 102 may change based on the use case.

At step 404, if the voltage is not above a threshold value current is generally passed to the surge protected electronic device. The threshold may be a predetermined threshold based on the expected voltage required by the electrical components. For example, the threshold voltage may be selected to be above 120V for a standard house in the United States running on 120V; however, the threshold may be below a limit voltage threshold for the components of the surge protected electronic device. Accordingly, when the voltage is applied at or near the standard acceptable voltage, current is passed, at step 406, to the surge protected electronic device. In some embodiments, the surge protected electronic device may be any computer, machine, appliance, mobile device, vehicle, telecommunications equipment, industrial panels, or any other electrically run device that may benefit from surge protection. Furthermore, capacitors 128 may act as a low-pass filter to filter out frequencies above a desired threshold.

At step 408, when a transient voltage is provided to surge arresting device 102, MOV 202 may clamp the transient voltage cutting off the high voltage from the surge protected device. In some embodiments, the transient voltage may be provided by a lightning strike, an electromagnetic pulse, static electricity, unfiltered electrical equipment, contact bounce, arcing, capacitor bank or generator mode switching, and/or any other occurrence that may result in a voltage surge or dip.

At step 410, the electrical energy is absorbed and redirected by MOV 202. MOV 202 may be any size and shape that provides suitable absorption of energy to redirect the current to ground. As surge protecting device is leadless between conductive plates 204 and the surge protected electronic device, there is little to no delay in redirecting the electrical energy.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A surge arresting apparatus, comprising:
   a plurality of metal oxide varistors;
   a plurality of conductive plates configured to conduct electrical energy between an electric power transmission cable and an electronic device,
   wherein the plurality of metal oxide varistors and the plurality of conductive plates are provided in a stacked alternating arrangement;
   a plurality of conductive clips directly coupled to the plurality of conductive plates and directly connected to the electronic device; and
   one or more capacitors in direct contact with at least one conductive plate of the plurality of conductive plates,
   wherein the plurality of metal oxide varistors are configured to redirect electrical current to a ground wire when a voltage above a threshold voltage is received at the plurality of conductive plates.

2. The surge arresting apparatus of claim 1, wherein the one or more capacitors is a single capacitor disposed between and in direct contact with a first conductive plate of the plurality of conductive plates and a second conductive plate of the plurality of conductive plates.

3. The surge arresting apparatus of claim 1, further comprising:
a first metal oxide varistor of the plurality of metal oxide varistors coupled between hot wire and the ground wire;
a second metal oxide varistor of the plurality of metal oxide varistors coupled between a neutral wire and the ground wire; and
a third metal oxide varistor of the plurality of metal oxide varistors coupled between the hot wire and the neutral wire.

4. The surge arresting apparatus of claim 1, further comprising a housing, the housing comprising a port providing the plurality of conductive clips to the electronic device.

5. The surge arresting apparatus of claim 4, wherein the housing and the plurality of conductive clips are configured as an International Electrotechnical Commission type A or type B port.

6. The surge arresting apparatus of claim 1,
wherein the electrical current is provided by the plurality of conductive clips when 120 Volts or less is applied to the plurality of conductive plates, and
wherein the threshold voltage is greater than 120 Volts.

7. The surge arresting apparatus of claim 1,
wherein the electrical current is provided by the plurality of conductive clips when 220 Volts or less is applied to the plurality of conductive plates, and
wherein the threshold voltage is greater than 220 Volts.

8. The surge arresting apparatus of claim 1, further comprising:
a first conductive plate of the plurality of conductive plates;
a first metal oxide varistor of the plurality of metal oxide varistors disposed directly below and in contact with the first conductive plate;
a second conductive plate of the plurality of conductive plates disposed directly below and in contact with the first metal oxide varistor;
a second metal oxide varistor of the plurality of metal oxide varistors disposed directly below and in contact with the second conductive plate;
a third conductive plate of the plurality of conductive plates disposed directly below and in contact with the second metal oxide varistor; and
a third metal oxide varistor disposed directly below and in contact with the third conductive plate,
wherein the first metal oxide varistor, the second metal oxide varistor, and the third metal oxide varistor are configured to redirect the electrical current to the ground wire when the voltage is above the threshold voltage.

9. A surge arresting apparatus, comprising:
an electric power transmission cable for transmitting power to an electronic device, the electric power transmission cable comprising:
a hot wire configured to carry current to the electronic device;
a neutral wire configured to carry current from the electronic device; and
a ground wire configured to carry current when a transient voltage is above a threshold voltage;
a surge arresting device connected in parallel with the electric power transmission cable and configured to redirect current, the surge arresting device comprising:
a plurality of metal oxide varistors;
a plurality of conductive plates configured to conduct electrical energy between the electric power transmission cable and the electronic device; and
one or more capacitors in direct contact with and disposed between at least two conductive plates of the plurality of conductive plates and configured to act as a low-pass filter; and
a plurality of conductive clips directly coupled to the plurality of conductive plates and configured to directly connect to the electronic device,
wherein the plurality of metal oxide varistors are configured to redirect electrical current to the ground wire when the transient voltage is above the threshold voltage.

10. The surge arresting apparatus of claim 9, further comprising a housing, wherein the surge arresting device is disposed within the housing, and wherein the housing provides the plurality of conductive clips to the electronic device in a configuration, wherein the configuration is one of International Electrotechnical Commission Type A-Type O.

11. The surge arresting apparatus of claim 10, wherein the threshold voltage is above 220 Volts.

12. The surge arresting apparatus of claim 9, further comprising a first capacitor in direct contact with and disposed between a first conductive plate and a second conductive plate, and a second capacitor in direct contact with and disposed between the second conductive plate and a third conductive plate, wherein the first capacitor and the second capacitor are arranged to form the low-pass filter.

13. The surge arresting apparatus of claim 9, further comprising:
a first conductive plate of the plurality of conductive plates attached to the hot wire;
a second conductive plate of the plurality of conductive plates attached to the neutral wire; and
a third conductive plate of the plurality of conductive plates attached to the ground wire.

14. The surge arresting apparatus of claim 13, wherein each metal oxide varistor of the plurality of metal oxide varistors is in contact with at least one surface of the first conductive plate, the second conductive plate, or the third conductive plate.

15. The surge arresting apparatus of claim 14, wherein the plurality of metal oxide varistors and the first conductive plate, the second conductive plate, and the third conductive plate are arranged in an alternating stacked arrangement and housed in a port connecting directly to the electronic device.

16. A surge arresting apparatus, comprising:
an electric power transmission cable for transmitting power to an electronic device, the electric power transmission cable comprising:
a hot wire configured to carry current to the electronic device;
a neutral wire configured to carry current from the electronic device; and
a ground wire configured to carry current when a transient voltage is above a threshold voltage;
a surge arresting device connected to the electric power transmission cable and configured to redirect current, the surge arresting device comprising:
a first metal oxide varistor connected between the hot wire and the ground wire;
a second metal oxide varistor connected between the neutral wire and the ground wire;
a third metal oxide varistor connected between the neutral wire and the hot wire;

a plurality of conductive plates configured to conduct electrical energy between the electric power transmission cable and the electronic device, wherein the plurality of conductive plates is arranged in an alternative stacked arrangement with the first metal oxide varistor, the second metal oxide varistor, and the third metal oxide varistor; and a capacitor disposed between and in direct contact with a first conductive plate of the plurality of conductive plates and a second conductive plate of the plurality of conductive plates, wherein the capacitor is configured as a low-pass filter; and a plurality of conductive clips directly coupled to the plurality of conductive plates and directly coupled to the electronic device, wherein the first metal oxide varistor, the second metal oxide varistor, and the third metal oxide varistor are configured to redirect electrical current to the ground wire when the transient voltage is above the threshold voltage.

17. The surge arresting apparatus of claim 16, further comprising:

a first conductive plate of the plurality of conductive plates contacting the first metal oxide varistor and connected to the ground wire;

a second conductive plate of the plurality of conductive plates contacting the first metal oxide varistor and the second metal oxide varistor and connected to either the hot wire or the neutral wire; and a third conductive plate of the plurality of conductive plates contacting the third metal oxide varistor and connected to either the hot wire or the neutral wire.

18. The surge arresting apparatus of claim 17, wherein the capacitor is a first capacitor; and further comprising a second capacitor disposed between and in direct contact with the second conductive plate and a third conductive plate of the plurality of conductive plates.

19. The surge arresting apparatus of claim 18, wherein the first conductive plate comprises a first conductive clip of the plurality of conductive clips, the second conductive plate comprises a second conductive clip of the plurality of conductive clips, and the third conductive plate comprises a third conductive clip of the plurality of conductive clips.

20. The surge arresting apparatus of claim 19, wherein the surge arresting device is configured to allow current to pass to the electronic device at or below 220 Volts.

* * * * *